(12) United States Patent
Park et al.

(10) Patent No.: US 11,764,575 B2
(45) Date of Patent: Sep. 19, 2023

(54) LOW VOLTAGE ELECTRICAL LOAD SHEDDING SYSTEM

(71) Applicant: Rivian IP Holdings, LLC, Plymouth, MI (US)

(72) Inventors: Tae Hoon Park, Irvine, CA (US); Tylynn Haddow, Irvine, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 151 days.

(21) Appl. No.: 17/370,077

(22) Filed: Jul. 8, 2021

(65) Prior Publication Data

US 2023/0009818 A1   Jan. 12, 2023

(51) Int. Cl.
*H02J 1/14* (2006.01)
*B60L 3/06* (2006.01)
*H02J 7/00* (2006.01)

(52) U.S. Cl.
CPC .................. *H02J 1/14* (2013.01); *B60L 3/06* (2013.01); *H02J 7/0063* (2013.01); *H02J 2207/20* (2020.01); *H02J 2310/48* (2020.01)

(58) Field of Classification Search
CPC ........ H02J 1/14; H02J 7/0063; H02J 2207/20; H02J 2310/48; B60L 3/06
See application file for complete search history.

(56) References Cited

U.S. PATENT DOCUMENTS

| | | | |
|---|---|---|---|
| 2013/0187446 A1* | 7/2013 | Ferrel | B60L 50/16 307/9.1 |
| 2020/0094679 A1* | 3/2020 | Mattmuller | H02J 1/14 |
| 2021/0078409 A1* | 3/2021 | Chen | B60R 16/0238 |
| 2021/0249949 A1* | 8/2021 | Leroy | H02M 1/40 |
| 2021/0262428 A1* | 8/2021 | Gibson | F02N 11/04 |
| 2022/0388368 A1* | 12/2022 | Li | B60H 1/00278 |

* cited by examiner

*Primary Examiner* — Jared Fureman
*Assistant Examiner* — Duc M Pham
(74) *Attorney, Agent, or Firm* — Haley Guiliano LLP (57) ABSTRACT

A battery load management system and methods of managing a battery load, e.g., in a vehicle, may be directed to a converter that steps down electrical power from an input voltage to a reduced voltage. An electrical bus in electrical communication with the converter may be configured to supply electrical power received from the converter at the reduced voltage to a plurality of electrical loads. A controller may be configured to detect a load shed trigger, and in response to the detection select one or more low-priority loads included in the plurality of electrical loads. The controller may also be configured to reduce electrical power consumption by the one or more low-priority loads.

18 Claims, 6 Drawing Sheets

LOW VOLTAGE ELECTRICAL LOAD SHEDDING SYSTEM

INTRODUCTION

The present disclosure is directed to an electrical load management system, and more particularly towards a system for shedding electrical loads of a converter.

SUMMARY

At least some example illustrations herein are directed to an electrical load management system for a vehicle that includes a converter, a low-voltage battery, and an electrical bus configured to supply low-voltage power from one or both of the converter and the low-voltage battery. The system may include a controller configured to: detect a load shed trigger of the converter, and in response to the detection select one or more low-priority loads from a plurality of electrical loads in connection with the electrical bus. The controller may also be configured to reduce electrical power consumption by the one or more low-priority loads.

In at least some example approaches, an electrical load management system for a vehicle includes a converter configured to step down electrical power from an input voltage to a reduced voltage and an electrical bus in electrical communication with the converter. The electrical bus may be configured to supply electrical power received from the converter at the reduced voltage to a plurality of electrical loads. The system may also include a controller configured to detect a load shed trigger, and in response to the detection select one or more low-priority loads included in the plurality of electrical loads. The controller may also be configured to reduce electrical power consumption by the one or more low-priority loads.

In at least some example approaches, a method of managing electrical loads in a power system for a vehicle includes reducing an input voltage of electrical power received at a converter to a reduced voltage. The method may also include using the converter to supply the electrical power at the reduced voltage to an electrical bus. The electrical bus may be configured to supply electrical power received from the converter at the reduced voltage to a plurality of electrical loads. The method may further include detecting a load shed trigger, and in response to the detection, reducing electrical power consumption by the one or more low-priority loads included in the plurality of electrical loads.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

A battery electric vehicle generally employs a battery pack for driving one or more electric motors to provide propulsion for the vehicle. These "traction" battery packs for vehicles generally have a relatively large capacity and operate at relatively high voltages, e.g., 400 Volts or more, to provide adequate vehicle range and power to motor(s) of the vehicle. The traction battery may also provide power to other loads with an operating voltage that is the same or similar to the typically high-voltage requirements of the motor. In some examples, vehicles may use a battery pack having an operating voltage of 400 Volts or 800 Volts to supply electrical power to the motor and other high-voltage devices of the vehicle. Other electrical loads or devices of the vehicle that do not require the elevated voltage and/or power supplied by the traction battery may be managed in a relative lower-voltage electrical subsystem of the vehicle. Merely as examples, controllers, heating/vent/air conditioning (HVAC) systems, lighting, and accessory power devices of the vehicle may be powered by the low-voltage electrical subsystem.

The high-voltage and low-voltage systems of the vehicle may be in electrical communication by way of a voltage converter. In an example, a DC/DC converter may step down an input voltage from the high-voltage system to supply power to the low-voltage system. In this manner, the traction battery may supply power to the devices or loads of the low-voltage system.

Heat is typically generated as a byproduct of the converter dissipating power when stepping down an input voltage to a reduced voltage, e.g., for a low-voltage system receiving electrical power from the converter. Excessive heat in a converter, e.g., due to high demand in the low-voltage system, insufficient cooling, or excessive heat from other components in the coolant loop such as inverters and motors (which typically can operate at much higher temperatures), may cause a converter to thermally derate. More specifically, a capability of the converter may be a function of temperature, such that a temperature of the converter above a threshold temperature may cause the converter to lose output capability. If the converter continues to operate in a thermally derated condition, a voltage drop may be observed in the power supplied by the converter to the low-voltage electrical system, which can result in loss of propulsion, braking, steering, essential exterior lights, view-clearing devices such as wipers, or other vehicle systems serviced by the low-voltage electrical system.

Accordingly, example approaches herein may detect conditions where it may be beneficial to shed relatively lower-priority loads of an electrical system or subsystem, such as in a vehicle. In some examples, a thermal derating of a converter, a voltage drop due to converter derating, certain loading conditions, or the presence of faults may be used as load shed triggers, which prompt an electrical load management system to proactively shed or reduce power loads. As will be discussed further below, one or more loads may be shed by, for example, implementing a power reduction by altering or adjusting a setting at the load(s) (e.g., by reducing current to a seat heating mechanism, lighting, etc.), reducing power or current consumed by the load(s), or by cutting off power to the load(s) by way of a power distribution unit. A thermal derating condition of the converter may thereby be reduced in degree or length of time or prevented entirely. In some example approaches, an electrical load management system sends a load shed signal to one or more control modules of the loads with an instruction to reduce power consumption, e.g., by changing a setting of the load(s), or by deactivating the load(s). In another example approach, a power distribution unit may supply power to electrical loads, and the electrical load management system cuts power to one or more low-priority or non-critical loads by cutting off power to the loads at the power distribution unit. The resulting reduction in electrical loads may reduce stress on the electrical system and reduce generation of heat at the converter, accelerating a recovery time for the converter to resume normal operation or preventing thermal derating entirely.

Figure 1:
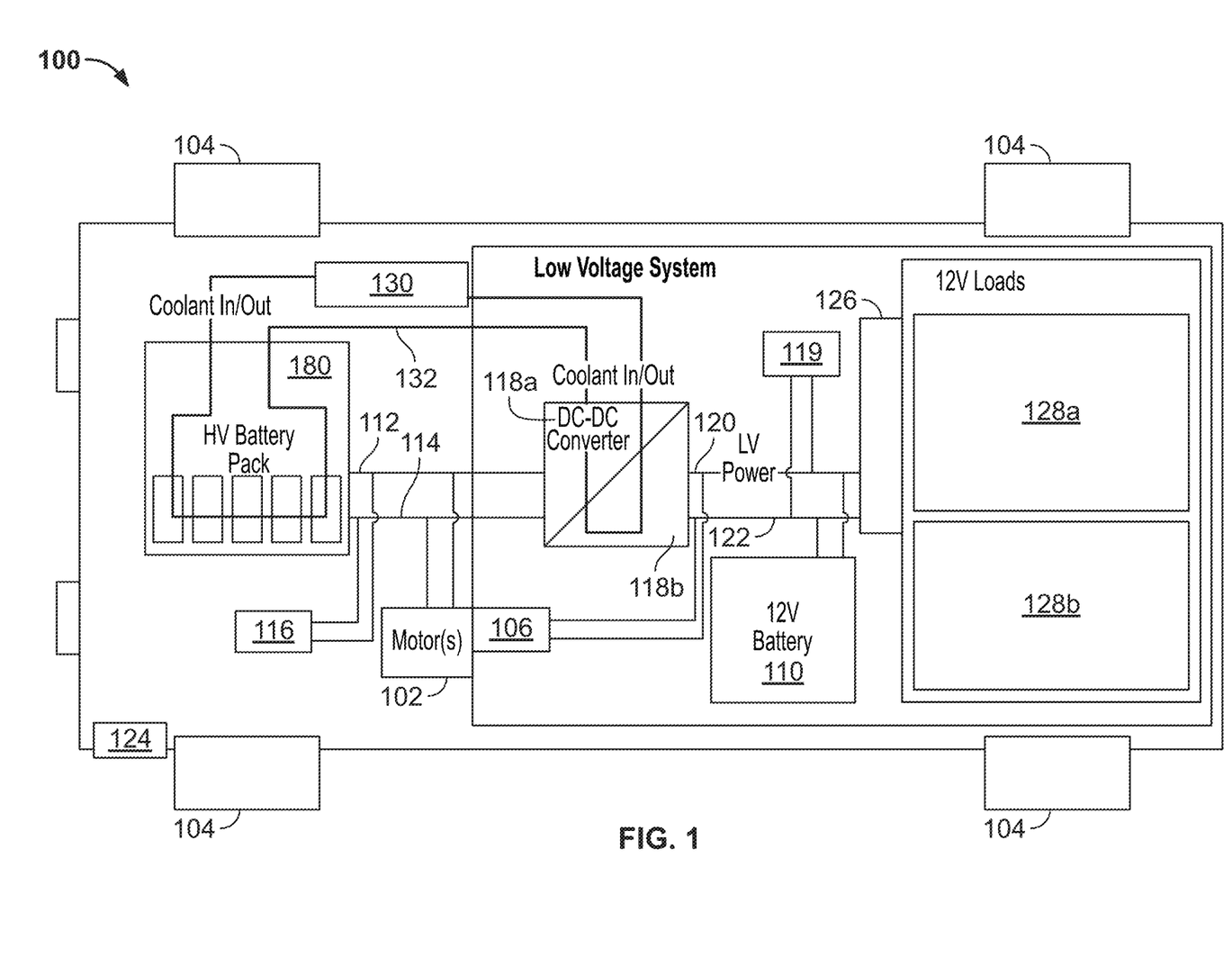
FIG. 1 shows a schematic view of an illustrative vehicle having a traction battery, a low-voltage electrical bus, and an electrical load management system, in accordance with some embodiments of the present disclosure.

Referring now to FIG. 1, an illustrative vehicle 100 is shown having multiple batteries for supplying electrical power to one or more electric motors 102, in accordance with some embodiments of the present disclosure. While a single motor 102 is illustrated schematically, the vehicle 100 includes four ground-engaging wheels 104 and may have multiple motors, e.g., one motor 102 for each wheel 104. Each motor(s) 102 may include an electric motor, a gearbox (e.g., a reduction gearset or pulley set), a shaft coupling (e.g., to one of wheels 104), auxiliary systems (e.g., a lubricating oil system, a cooling system, a power electronics system), any other suitable components, or any combination thereof to provide torque to one or more of the wheels 104.

The motor(s) 102 may be coupled to a motor control system 106. The motor control system 106 may be configured to generate commands for each of the motor(s) 102 to effect driving of the vehicle 100, e.g., by way of torque commands. In some embodiments where multiple motors 102 are provided, motor control system 106 generates control signals for each of the motors 102. The control signals may include messages, current values, pulse width modulation (PWM) values, any other suitable values, any other information indicative of a desired operation, or any combination thereof. The motor control system 106 may also include a speed controller (e.g., a proportional-integral-derivative (PID) feedback controller), a torque controller, a current controller (e.g., per motor phase of each motor), a position controller, any other suitable controllers, or any combination thereof. Moreover, motor control system 106 may include adaptive cruise control, semi-autonomous control, or fully autonomous control capabilities with respect to the vehicle 100 and components thereof, e.g., the motor(s) 102, vehicle steering, etc.

The vehicle 100 may include a first battery pack 108, which may be a traction battery for driving the motor(s) 102. The vehicle 100 may also have a second battery 110 for supplying relatively lower-voltage power to other modules or electrical components of the vehicle 100. For example, as will be discussed further below, the second battery 110 may be used to supply power to various controllers of the vehicle 100, e.g., motor controller 106, an air conditioning controller, display controllers, etc.

The battery pack 108 and low-voltage battery 110 may be connected with motor 102 and other electrical devices of the vehicle 100 in any manner that is convenient, e.g., by way of an electrical bus system of the vehicle 100. In the example illustrated in FIG. 1, the battery pack 108 is connected with a positive bus rail 112 and a negative bus rail 114 of a high-voltage portion of the electrical system of the vehicle 100. Generally, the battery pack 108 provides a high-voltage power supply to meet requirements for operating the motor(s) 102 to provide sufficient propulsion to the vehicle 100 and adequate range. In one example, the battery pack 108 has an operating voltage of 400 Volts, although other operating voltages may be employed without limitation. The traction battery 108 may also supply electrical power at its operating voltage to other high-voltage electrical modules 116 of the vehicle 100. The high-voltage electrical modules may include any electrical device capable of being operated at higher voltages such as that of the battery pack 108, e.g., an air compressor.

In contrast to the traction battery 108, the low-voltage battery 110 may be a secondary or relatively lower-voltage battery with a primary purpose of supplying power to various modules or devices of the vehicle 100 that do not have the higher input voltage requirements of the motor 102 and other high-voltage modules 116. Merely by way of example, the secondary battery 110 may be a 12 Volt battery. The secondary battery 110 may generally provide power to controllers of the vehicle (e.g., the motor controller 106 as shown in FIG. 1A), accessories, or any other module or device of the vehicle with relatively lower voltage requirements than the motor(s) 102 or the high-voltage electrical modules 116. The low-voltage battery 110 is connected to a low-voltage electrical bus comprising a positive bus rail 120 and negative bus rail 122.

An electrical converter 118 generally interfaces between the low-voltage and high-voltage electrical systems of the vehicle 100. The converter 118 may be electrically connected to the positive bus rail 112 and the negative bus rail 114 and may thereby receive an input voltage from the traction battery 108. In an example illustration, the converter 118 is a DC/DC converter that is configured to decrease a relatively high voltage received from the bus rails 112, 114, e.g., typical of the operating voltage of the battery pack 108, and supply electrical power to the second battery 110 and loads in the low-voltage system of the vehicle 100 at a reduced voltage. The converter 118 may receive the elevated or high-voltage input at a high-voltage side 118a, and step down the input voltage to a reduced voltage at a low-voltage side 118b. The converter 118 may thus charge the second battery 110. The converter 118 may include a transformer, a buck-boost converter, or the like to facilitate selective reduction of an input voltage at the high-voltage side 118a to an output voltage at the low-voltage side 118b.

As noted above, the low-voltage battery 110 may communicate with low voltage bus rails 120, 122 to provide power to the low-voltage modules or electrical loads of the vehicle 100. One or more of the loads may be priority loads 128a, e.g., which are prioritized over other non-priority loads 128b as will be discussed further below. The low voltage loads 128 may be grouped into distinct priority groups on any basis that is convenient. Merely as one example, the priority loads 128a may include devices that are important for vehicle safety, e.g., controllers for the motor(s) 102, thermal management of the traction battery 108, vehicle safety systems, etc. By contrast, the non-priority loads 128b may include devices or loads that are of lesser importance relative to the priority loads 128a. As non-limiting examples, the non-priority loads 128b may include interior or other accent lighting, heated/cooled seating surfaces, HVAC system, accessory power ports, or the like.

The vehicle 100 may also have a charge port 124 for facilitating charging of the battery pack 108 and/or the secondary battery 110. The charge port 124 may be configured to allow charging via a typical AC power supply or via a DC power supply of a relatively higher voltage. Contactors or switches (not shown) may facilitate communicating electricity from a DC power supply upon connection to the charge port 124, with the battery pack 108 being charged by way of the bus rails 112, 114, for example. The charge port 124 may also be configured to charge the battery pack 108 with a relatively lower-voltage AC power supply, e.g., by way of an on-board charger (not shown) that converts the input AC power received at the charge port 124 to DC power for charging the traction battery 108.

The vehicle 100 also includes a coolant reservoir 130 configured to circulate coolant in a coolant loop 132 circulating through the converter 118. The vehicle 100 may thereby control the temperature of the converter 118. The coolant loop 132 may also circulate through the traction battery 108, such that the traction battery 108 and converter 118 share a same coolant reservoir. Alternatively, separate coolant loops or reservoirs may be provided for each, or shared with a cooling loop for powertrain components such as the motor(s) 102.

The vehicle 100 may also include an electrical load management system controller 119, which may also be powered by the low voltage bus rails 120, 122 in the low-voltage system of the vehicle 100. As will be described further below, the load management system controller 119 may include a controller or processor, and a memory in communication with the controller. The memory may include a computer-readable storage medium tangibly embodying instructions that cause the controller or processor thereof to implement various processes or steps thereof described further below. In some examples, the controller 119 is configured to detect a load shed trigger of the converter, and in response to the detection select one or more of the non-priority loads 128b and reduce electrical power consumption by the identified non-priority load(s).

As will be discussed in further detail below, load shed triggers may be identified in response to any electrical load conditions of the vehicle 100 that are convenient. In at least some example approaches, load shed triggers may be determined in response to condition(s) that indicate the converter 118 is or may soon begin to thermally derate. For example, a load shed trigger may relate to a temperature of the converter 118 or coolant loop 132, such that a coolant temperature exceeding a predetermined threshold may result in setting a load shed trigger flag. In another example illustration, a difference between a desired or typical voltage in the low-voltage system of the vehicle 100 may cause the controller 119 to determine a load shed trigger. For example, an undervoltage of the electrical bus rails 120, 122 (i.e., below the voltage typical of the battery 110 and/or the electrical bus rails 120/122) that exceeds a given threshold may also cause the controller 119 to determine a load shed trigger. In another example, a fault of the converter 118 may cause the controller 119 to determine a load shed trigger. In still other examples, a power limitation or fault of other electrical components of the vehicle 100, e.g., the traction battery 108, may be used by the controller 119 to determine a load shed trigger. The controller 119 may also determine a load shed trigger in response to electrical demands being placed upon the vehicle 100. For example, where it is desired to maximize charging rate of the traction battery 108, the controller 119 may determine a load shed trigger in an effort to reduce electrical demands within the vehicle 100 that might reduce charging rates.

The controller 119 may reduce power consumption by electrical loads in any manner that is convenient. In one example approach, the controller 119 determines a load shed trigger is present, and sends an instruction request to another controller or to the load(s) to effect a reduction in power consumption by the load(s). For example, the controller 119 may send a request for the low-priority load(s) to reduce power usage, alter a setting of the low-priority load(s), or shut down via a communications bus of the vehicle 100.

Alternatively, the vehicle 100 may have a switched power distributor 126 or controller which controls flow of electrical power to the low-voltage electrical loads 128. In these examples, the controller 119 may reduce electrical power to low-priority load(s) by deactivating power supplied to the low-priority load(s) via the switched power distributor 126.

Figure 2:
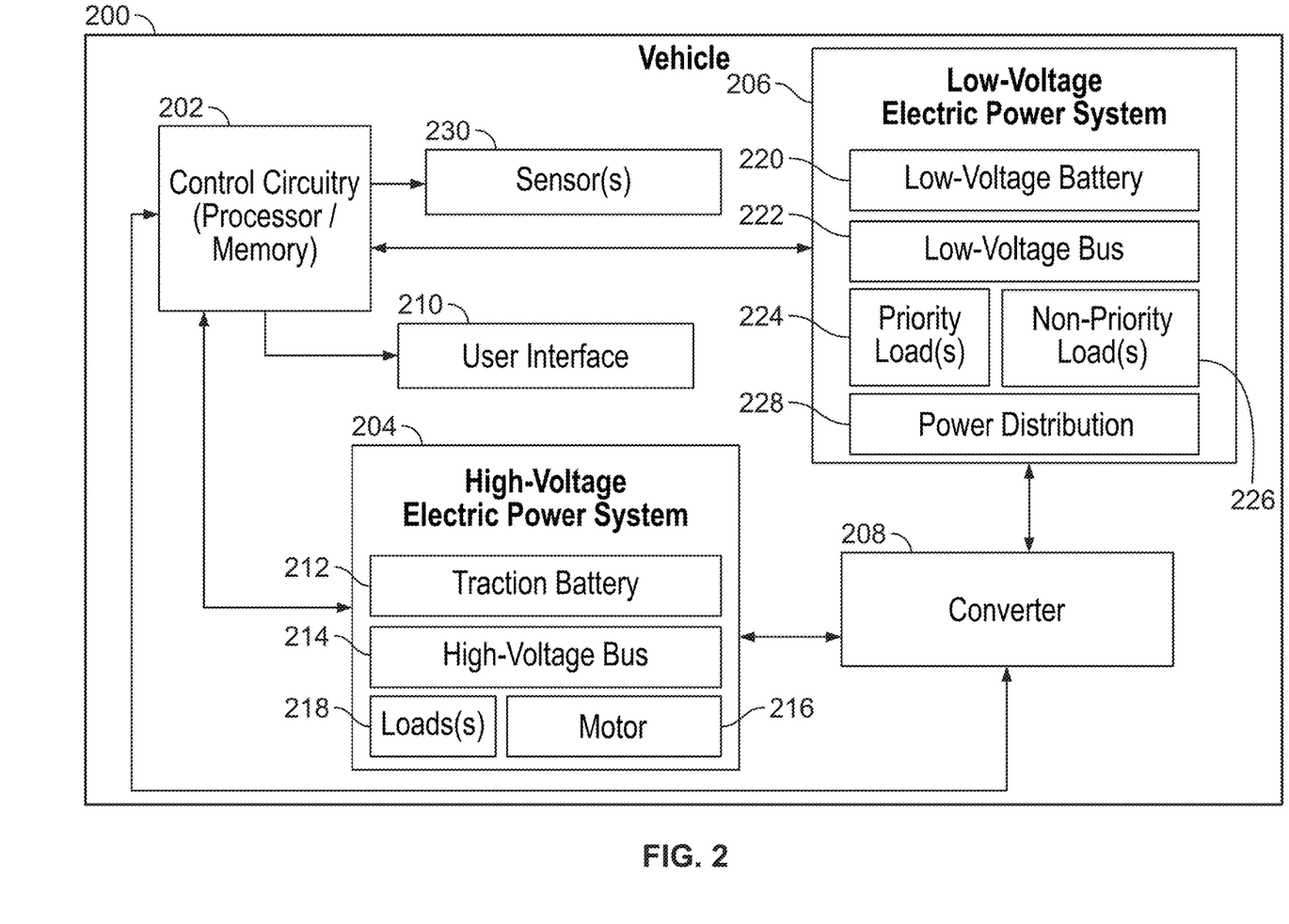
FIG. 2 shows a block diagram of an illustrative electrical load management system for a vehicle, in accordance with some embodiments of the present disclosure.

FIG. 2 shows a block diagram of an illustrative vehicle having an electrical load management system for controlling power to a low-voltage electrical system, in accordance with some embodiments of the present disclosure. In an example, the vehicle 200 is vehicle 100. Vehicle 200 includes a control circuitry 202, which in some embodiments is the controller 119 described above. The vehicle 200 is also illustrated having a high-voltage electric power system 204, a low-voltage electric power system 206, a converter 208, and a user interface 210. The high-voltage electric power system 204 may include, for example, a vehicle battery pack, e.g., traction battery 212, having a plurality of battery cells. For example, subsets of the battery cells may be coupled in parallel, with the subsets coupled in series with each other to form a DC bus (e.g., to drive one or more electric drive motors, auxiliaries, or other electrical loads). The vehicle may be, but need not be, an electric vehicle. For example, the high-voltage electric power system 204 may provide electrical energy to a motor 216 and associated drivetrain, as well as auxiliary components, any other suitable modules or systems, or a combination thereof. The high-voltage electric power system 204 may also include a high-voltage bus 214 including bus rails configured to facilitate conduction of electricity and/or communication of the processor 202 with the high-voltage electric power system 204 and any components thereof. Additional electrical loads 218 may also be serviced directly by the high-voltage electric power system 204, e.g., an air compressor, by way of the high-voltage bus 214.

Low-voltage electric power system 206 may generally provide power to low-voltage electrical loads of the vehicle 200, which may include priority loads 224 and non-priority loads 226. The low-voltage electric power system 206 may include a low-voltage bus 222, which provides electrical power from a low-voltage battery 220 and/or the converter 208. For example, the converter 208 may reduce an input voltage received from the high-voltage electric power system 204, e.g., from the traction battery 212, to a reduced voltage that may be in turn supplied to components of the low-voltage electric power system 206. While the electrical loads are divided into two groups in the illustrated example (i.e., priority and non-priority), the loads 224, 226 may be grouped by relative priority into any greater number of groups and may in some examples be ranked individually by priority.

Control circuitry 202 may include hardware, software, or both, implemented on one or more modules configured to provide control of the power provided to at least the low-voltage electrical loads 224 and 226 of the vehicle 200. In some embodiments, control circuitry 201 includes one or more microprocessors, microcontrollers, digital signal processors, programmable logic devices, field-programmable gate arrays (FPGAs), application-specific integrated circuits (ASICs), or any suitable combination thereof. In some embodiments, control circuitry 202 is distributed across more than one processor or processing units. In some embodiments, control circuitry 202 executes instructions stored in memory for managing power provided to the low-voltage electrical loads 224 and 226 of the vehicle 200. In some embodiments, memory is an electronic storage device that is part of control circuitry 202. For example, memory may be configured to store electronic data, computer instructions, applications, firmware, or any other suitable information. In some embodiments, memory includes random-access memory, read-only memory, hard drives, optical drives, solid-state devices, or any other suitable memory storage devices, or any combination thereof. For example, memory may be used to launch a start-up routine.

In some embodiments, the control circuitry 202 may be communicatively connected to the high-voltage electrical power system 204, the low-voltage electric power system 206, the converter 208, and the user interface 210. The control circuitry 202 may thereby receive operational information regarding the low-voltage electric power system 206, the converter 208, and/or the high-voltage electric power system 204 to determine a load shed trigger. The control circuitry 202 may also provide information to a user, e.g., a driver or passenger of the vehicle 200, by way of the user interface 210. In an example, the user interface 210 includes a display, screen, or the like for visually displaying an indication of a load shed trigger or other conditions of the vehicle 200.

As noted above, the control circuitry 202 may be configured to determine a load shed trigger in response to one or more conditions indicating that the converter 208 is thermally derating or a likelihood that the converter 208 is at risk of thermally derating. Merely as examples, the control circuitry 202 may determine a load shed trigger based upon conditions of electrical components of the vehicle 200, e.g., an undervoltage in the low-voltage bus 222, a fault of the converter 208, or the like. In other examples, the control circuitry 202 determines a load shed trigger in response to a coolant temperature, e.g., of a coolant servicing the converter 208, exceeding a threshold temperature. To this end, the vehicle 200 may include one or more sensors 230, by which the control circuitry 202 may determine such conditions.

As noted above, the loads of the low-voltage electric power system 206 may be organized into categories based upon priority, which may be used to determine whether/which of the electrical loads of the low-voltage system 206 to reduce power to in the case of a load shed trigger. Merely by way of example, non-priority loads 226 may include one or more, and in some cases all, of:

an HVAC module for the front driver and/or passenger of the vehicle 200;
an HVAC module for the rear passengers;
accessory power outlets such as a 12 Volt accessory power outlet, USB, or other standardized power outlet;
an audio amplifier;
a powered driver and/or passenger seat (e.g., for positional adjustments to the seat);
vehicle seat heating and/or cooling mechanisms;
a vehicle winch;
side view mirror angle adjusters;
vehicle glass defrosters or heaters;
a vehicle AC/DC power converter;
a compressor for air suspension components of the vehicle;
a hydraulic suspension pump of the vehicle; or
one or more suspension valves of the vehicle.

Generally, the foregoing non-priority loads 226 do not impact safety or vehicle propulsion or guidance, and as a result may be deactivated or reduced in capacity.

By comparison, priority loads may include relatively more important vehicle control features or safety systems of the vehicle. In at least some example approaches, electrical power is generally not interrupted by way of load shedding for any one of:

propulsion control systems for the vehicle 200;
control systems of the traction battery 212;
thermal management of the traction battery 212 or other components of vehicle 200; or
exterior visibility features, e.g., windshield wiper motors.

In an example, a load shedding strategy may include disabling completely each of the non-priority loads listed above. Alternative approaches are possible, however, including disabling only a subset of the non-priority loads, or reducing power to one or more of the non-priority loads. Moreover, load shedding may be implemented in stages. In an example of this approach, the control circuitry 202 may initially deactivate a subset of the non-priority loads 226, and/or reduce power to one or more of the non-priority loads 226. If the load shed trigger or related conditions persist or become more acute, the control circuitry 202 may proceed to reduce power consumption further or cease power supply to additional non-priority loads 226.

Figure 3:
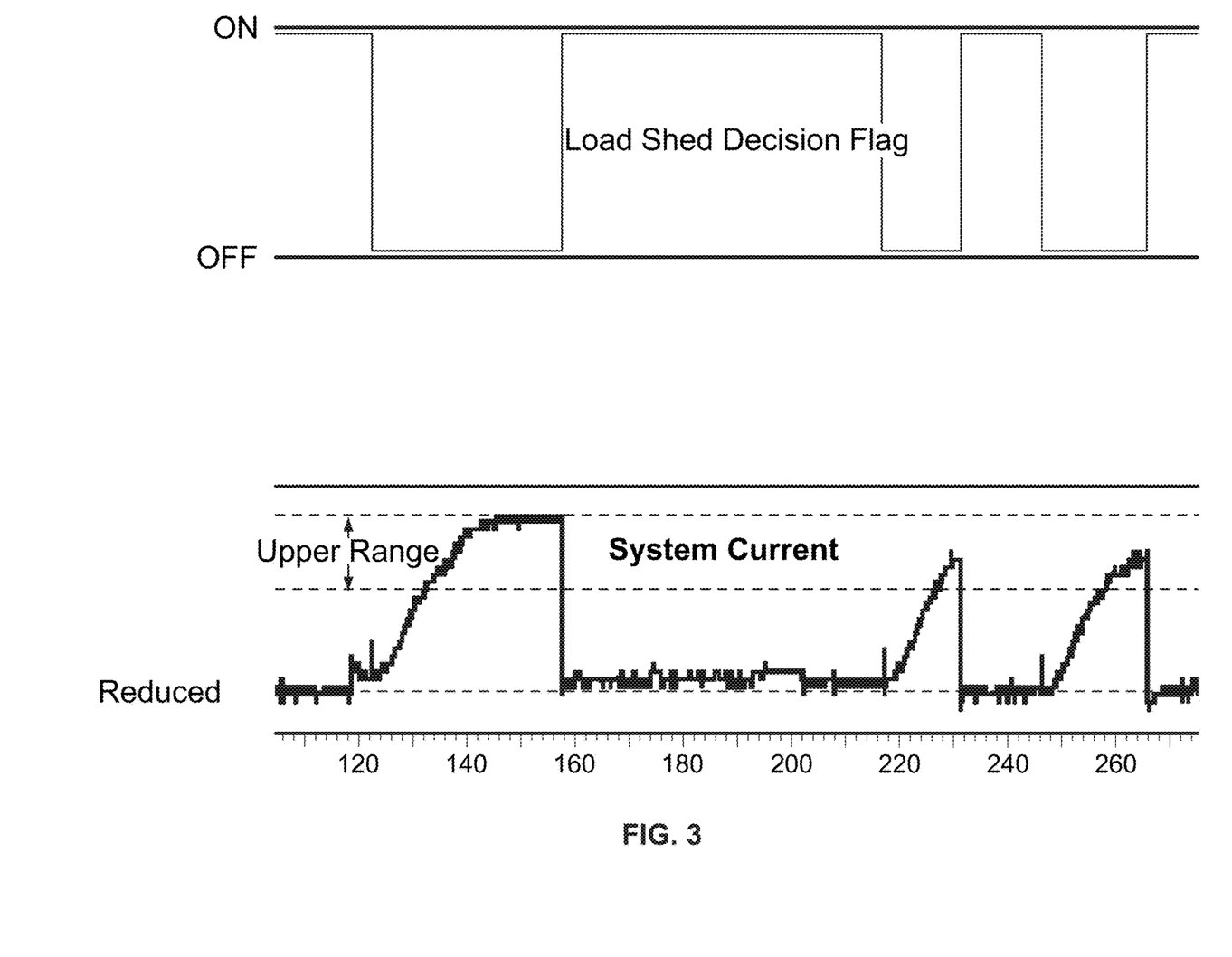
FIG. 3 shows a graph of a load decision flag and current in an electrical system over time, in accordance with some embodiments of the present disclosure.

Turning now to FIG. 3, an effect of a load shed trigger on current in an electrical system, e.g., low-voltage electrical power system 206, is described in further detail. More specifically, activation of a load shed flag and current in an electrical bus, e.g., low-voltage bus 222, are plotted over time. Upon activation of the load shed flag, current is reduced as a result of a reduction in electrical power consumption of one or more loads of the system. Overall current may therefore be reduced from a normal or nominal range to a reduced level by limiting electrical power consumption, e.g., by identified low-priority loads. In the illustrated example, a normal range of current may be defined by an upper limit of approximately 100 Amperes (A), and be reduced to approximately 10 A as a result of limiting electrical power consumption of lower-priority load(s). This range of typical current levels and reduction is merely an example, however, and other current ranges/reductions may be employed without limitation.

Figure 4:
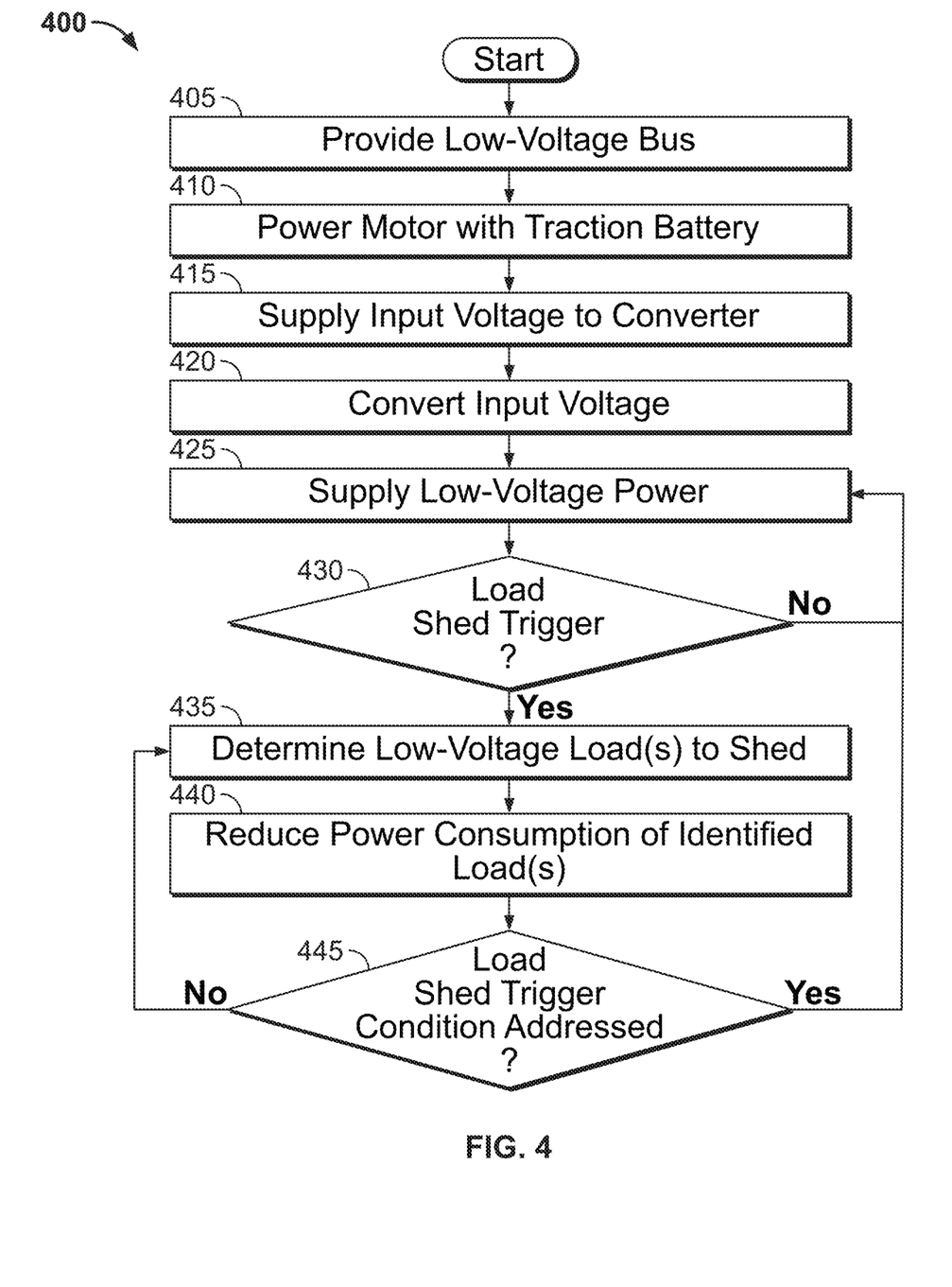
FIG. 4 shows a flowchart of an illustrative process for shedding one or more low-voltage loads, in accordance with some embodiments of the present disclosure.

Turning now to FIG. 4, an example process 400 of shedding one or more low-voltage loads is described in further detail. Process 400 may begin at block 405, where a low-voltage bus is provided, e.g., of a vehicle. For example, as discussed above a battery 110 may be in electrical communication with a low-voltage bus having positive bus rail 120 and negative bus rail 122. The battery 110 may be placed in electrical communication or powered up to provide electrical power in a low-voltage electric power system. The battery 110 may be configured to supply electrical power at the reduced voltage via the electrical bus to one or more low-voltage loads. Process 400 may then proceed to block 410.

At block 410, a traction battery or high-voltage battery pack may selectively power a traction motor configured to supply motive power to one or more ground-engaging wheels of a vehicle, e.g., to provide propulsion to the vehicle.

Proceeding to block 415, power may be supplied to a converter at an input voltage, e.g., with the high-voltage battery pack. For example, as discussed above, a high-voltage or traction battery 108/212 may generally have an elevated operating voltage, at least in comparison to a low-voltage electric power system 206. Process 400 may then proceed to block 420.

At block 420, an input voltage of electrical power received at a converter may be converted, e.g., to step down a voltage of the input electrical power to a reduced voltage. For example, as discussed above a relatively higher input voltage, e.g., typical of an operating voltage of battery pack 108/212, may be stepped down via converter 118/208 to a relatively lower voltage typical of low-voltage electric power system 206. Process 400 may then proceed to block 425.

At block 425, the electrical power may be supplied, e.g., via the converter, at the reduced voltage to an electrical bus. For example, low-voltage electrical bus 222 may be configured to supply electrical power received from the converter 208 at a relatively low or reduced voltage (as compared with the high-voltage power input to the converter 208) to a plurality of electrical loads, to charge a low-voltage battery, etc. Process 400 may then proceed to block 430.

At block 430, process 400 may query whether a load shed trigger is present. For example, as noted above, a controller 119 or control circuitry 202 may determine a load shed trigger is present in response to conditions indicating that the converter 118/208 is thermally derating or may thermally derate without intervention. Accordingly, process 400 may detect a load shed trigger in response to any such conditions. Detecting the load shed trigger may include, merely as examples, detecting that a coolant temperature or other operating temperature associated with the converter exceeds a predetermined threshold. In other examples, a power limitation of the traction battery module, a fault of the traction battery module, an undervoltage of the electrical bus below the reduced voltage, or a fault of the converter may be used by the controller 119 and/or control circuitry 202 to determine a load shed trigger. In one example approach, a threshold undervoltage of 0.7 V in a 12 V electrical bus/battery of a low-voltage electric power system may be used to initiate load shedding. In another example approach, a coolant temperature associated with an electrical converter that exceeds 70 degrees Celsius (C.) may be used to initiate load shedding. Any other relevant condition or threshold may be employed that is convenient.

Where process 400 determines the presence of a load shed trigger, process 400 may proceed to block 435. Alternatively, process 400 proceeds back to 425 and continues supplying power to the low-voltage loads.

At block 435, process 400 may determine one or more non-priority load(s), to which electrical power consumption may be reduced or cut off in an effort to reduce the extent of or prevent a thermal derating of the converter. In an example, the controller 119 and/or control circuitry 202 may prioritize loads being serviced by the converter 118. Low-priority loads may be identified by the controller 119 and/or control circuitry 202, e.g., based upon an importance to vehicle control or safety, merely as one example.

Proceeding to block 440, electrical power may be supplied by way of the low-voltage electrical system to the loads associated with the low-voltage electric power system, with a reduction in consumption of electrical power or cessation of electrical power to the load(s) identified at block 435 as being of lower priority or criticality to operation of the vehicle. In some example approaches, reducing electrical power to the identified load(s) includes sending a bus message to the identified load(s) or a controller/subcontroller of the identified load(s). In another example, a setting may be reduced at the load(s), e.g., a maximum heat selection for a seat heater may be made unavailable, thereby limiting power consumption of the seat heater. In other example approaches, reducing electrical power to the identified load(s) may include deactivating power supplied via a switched power distributor. Process 400 may then proceed to block 445.

At block 445, process 400 may query whether the load shed trigger condition(s) have been addressed via the reduction in power initiated at block 435/440. This query may be related to the same condition(s) used to determine the presence of the load shed trigger. For example, where a temperature exceeding a threshold is used at block 430 to determine a load shed trigger, a temperature threshold may be employed to determine whether the load shed trigger condition has been addressed by the depowering of load(s) at block 440. Similarly, where an undervoltage in the low-voltage electric power system is used to determine a load shed trigger, process 400 may query whether the undervoltage condition has ceased as a result of the reduced power initiated at block 435/440. In some examples, a threshold value(s) used to determine whether a load shed trigger or related condition has passed may be different from a value used to determine onset of the load shed trigger. For example, continuing with the above example at block 435 where an undervoltage of 0.7 Volts (V) is used to initiate load shedding, a relatively lower threshold of 0.3 V may be used to determine whether the load shedding process should conclude. In the example using a coolant temperature of 70 degrees Celsius as the initial threshold at block 435, a coolant temperature of 65 degrees Celsius may be employed to determine that the load shedding process should conclude at block 445. These example margins between an initial threshold to determine onset of a load shedding condition and a subsequent threshold to determine that the load shedding condition has been sufficiently addressed may ensure that the load shedding process is deactivated only after the load shed trigger condition has been sufficiently addressed, reducing the likelihood the identified low-voltage loads are repeatedly activated and deactivated (e.g., due to a voltage or temperature hovering closely above/below a threshold that is used to determine initial onset of the load shed trigger condition).

Where the load shed trigger has been sufficiently addressed, process 400 may proceed to block 425, such that process 400 facilitates supply of low-voltage power to the low-voltage electric power system. Alternatively, if the load shed trigger condition has persisted (or worsened), process 400 may proceed to block 435. Accordingly, process 400 may again evaluate whether additional low-voltage loads should be shed or reduced in power consumption, e.g., in a continuing effort to address or prevent thermal derating of a converter.

Figure 5:
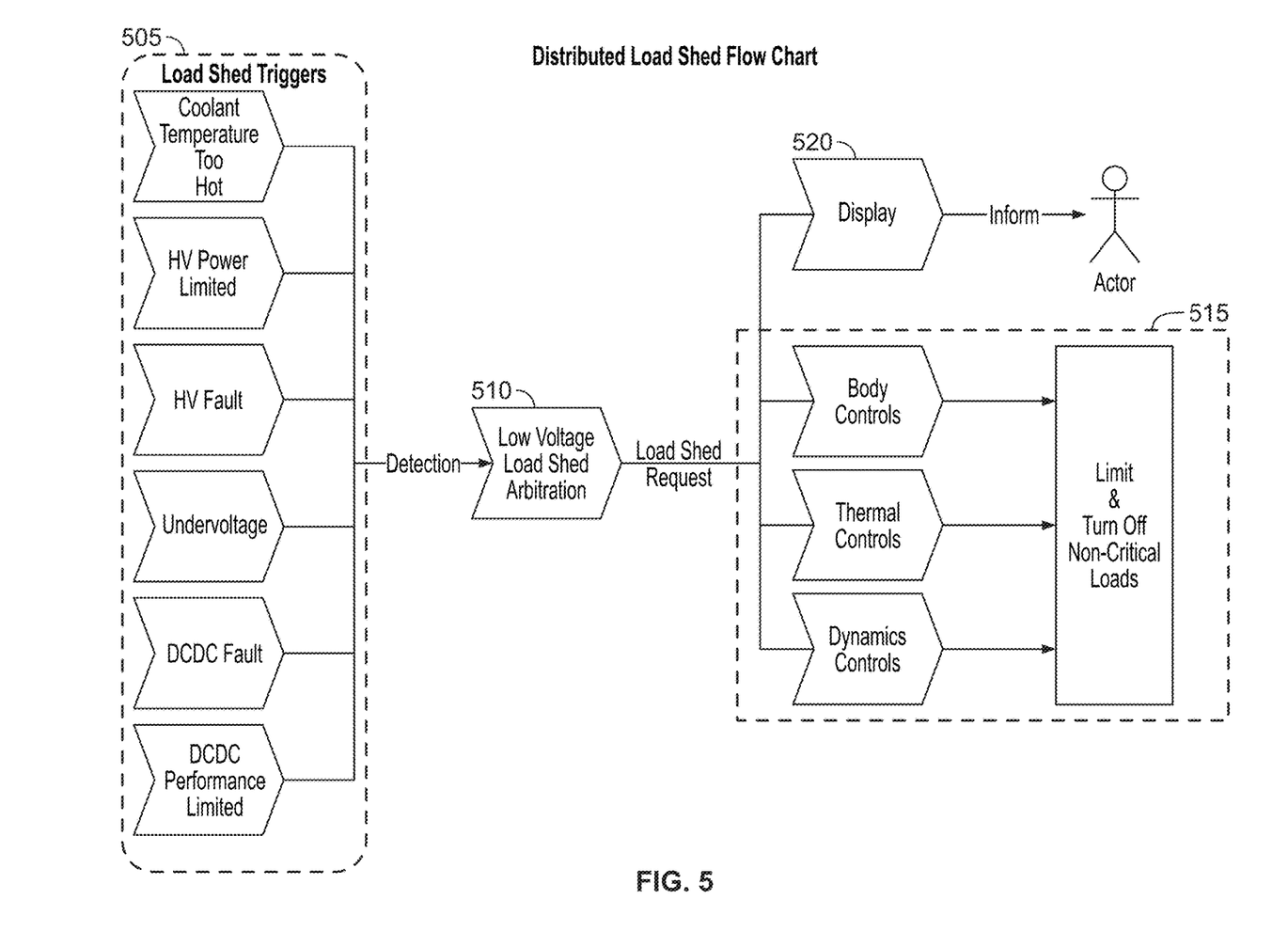
FIG. 5 shows a flowchart of another illustrative process for shedding one or more low-voltage loads, in accordance with some embodiments of the present disclosure.
Figure 6:
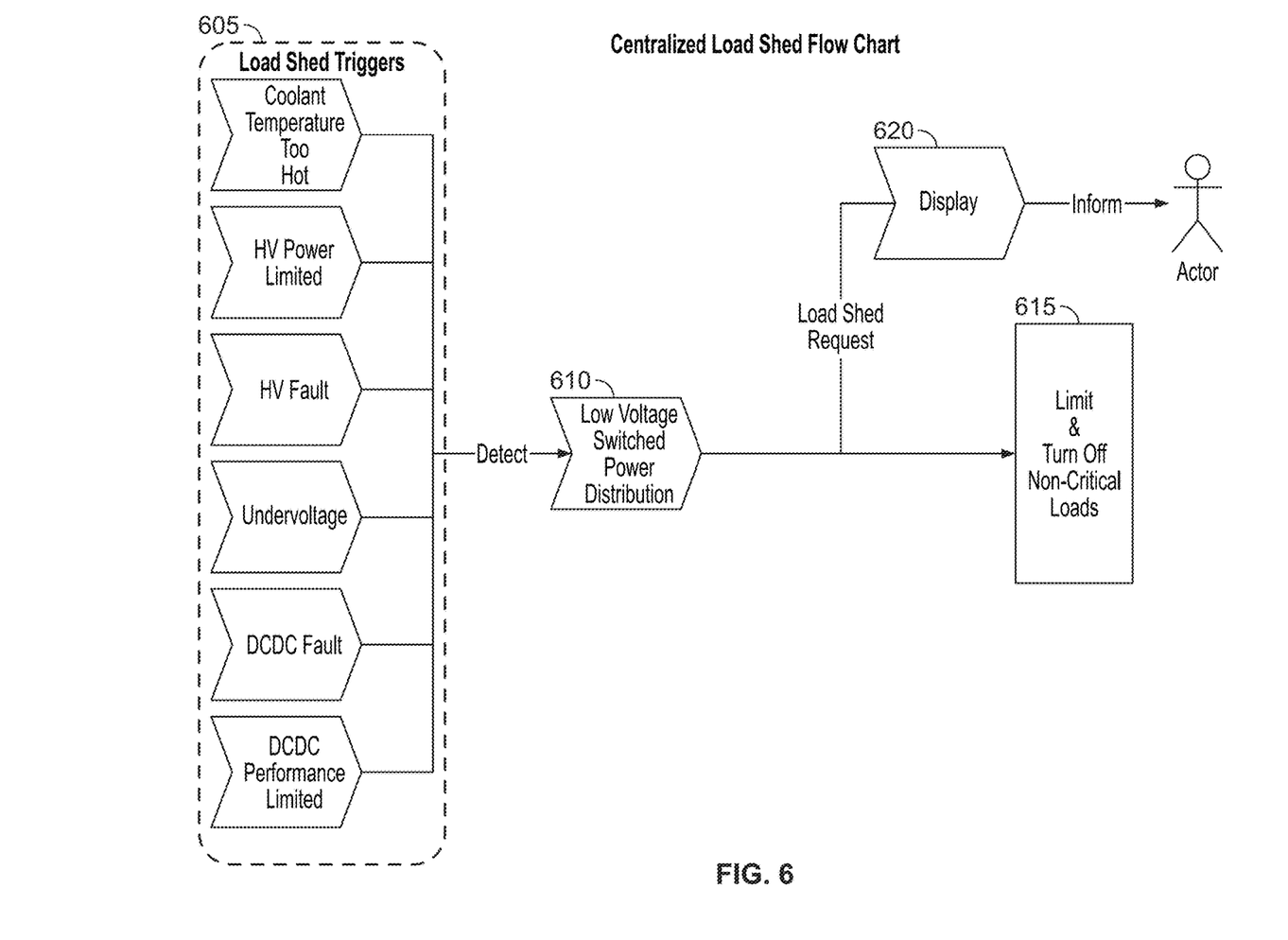
FIG. 6 shows a flowchart of another illustrative process for shedding one or more low-voltage loads, in accordance with some embodiments of the present disclosure.

Turning now to FIGS. 5 and 6, example flow charts for processes 500, 600 of identifying one or more loads in an electrical system as non-critical or non-priority loads, and implementing load shedding for the identified loads, are described in further detail. These processes may be implemented, for example, by the controller 119 and/or control circuitry 202 of vehicle 100 or vehicle 200, respectively. The example processes 500, 600 below may also be implemented as a part of process 400 described above, e.g., at blocks 430 and/or 435. Generally, in the processes below one or more load shed triggers may be identified that may indicate conditions in which it may be desirable to reduce electrical power consumption of lower-priority loads in an electrical system. Process 500 may be referred to as a "distributed" load shedding process, i.e., where loads are shed by sending instructions or requests to low-voltage load(s) or associated controller(s) to initiate reductions in power. By contrast, the example process 600 employs a "centralized" load shed process, which may be initiated using a switched power distribution or distributor, which directly reduces or cuts electrical power to identified load(s).

Referring now to the example process 500 of FIG. 5A, at block 505 a plurality of load shed triggers are identified. More specifically, the load shed trigger conditions may include one or more of a coolant temperature threshold, a limitation of high-voltage power, a high-voltage fault, an undervoltage in the low-voltage electric power system, a converter fault, and a converter performance limitation. Controller 119 and/or control circuitry 202 may monitor for each of these conditions, e.g., by way of sensors or a communication link with relevant component(s) of vehicle 100/200. Upon detection of one or more of these conditions, process 500 may proceed to block 510.

At block 510, process 500 may initiate a low-voltage load shed arbitration. For example, controller 119 and/or control circuitry 202 may identify one or more low-voltage loads of the vehicle 100/200 that can be shed. In some example approaches, non-critical or non-priority low-voltage loads may be predetermined, such that process 500 initiates load shedding for each of the predetermined low-voltage loads upon detection of one or more load shed triggers, e.g., the conditions indicated at block 505. In other examples, controller 119 and/or control circuitry 202 may initiate load shedding for a subset of the identified non-critical/non-priority low-voltage loads, depending upon a current draw of the low-voltage loads. More specifically, if a single low-voltage load included in the non-priority loads is responsible for a relatively large share of the current distributed in a low-voltage electrical system, process 500 may initiate load shedding for that load (only).

Proceeding to block 515, process 500 initiates a load shed request by transmitting a request to one or more of the low-voltage load(s) identified at block 510. For example, controller 119 and/or control circuitry 202 may transmit a bus message to the identified load(s) or a controller/subcontroller of the vehicle associated with the identified load(s).

At block 520, process 500 may also display a message to an actor or user associated with the vehicle indicating the initiation of load shedding. For example, a message may be displayed via user interface 210. Accordingly, a user may be made aware of the load shedding and/or underlying condition of the vehicle. Process 500 may then terminate.

Turning now to FIG. 6, another example process 600 for identifying and reducing power to one or more low-voltage loads is illustrated and described in further detail. At block 605, a plurality of load shed triggers are identified. More specifically, the load shed trigger conditions may include one or more of a coolant temperature threshold, a limitation of high-voltage power, a high-voltage fault, an undervoltage in the low-voltage electric power system, a converter fault, and a converter performance limitation. Controller 119 and/or control circuitry 202 may monitor for each of these conditions, e.g., by way of sensors or a communication link with relevant component(s) of vehicle 100/200. Upon detection of one or more of these conditions, process 600 may proceed to block 610.

At block 610, process 600 may initiate a low-voltage load shed arbitration and power reduction via a switched power distributor, e.g., switched power distributor 126 or power distribution 228. Controller 119 and/or control circuitry 202 may thus identify one or more low-voltage loads of the vehicle 100/200 that can be shed, and initiate reduction or cessation of electrical power to the identified low-voltage loads using the switched power distributor 126 or power distribution 228.

In some example approaches, non-critical or non-priority low-voltage loads may be predetermined, such that process 600 initiates load shedding for each of the predetermined low-voltage loads upon detection of one or more load shed triggers, e.g., the conditions indicated at block 605. In other examples, controller 119 and/or control circuitry 202 may initiate load shedding for a subset of the identified non-critical/non-priority low-voltage loads, depending upon a current draw of the low-voltage loads. More specifically, if a single low-voltage load included in the non-priority loads is responsible for a relatively large share of the current distributed in a low-voltage electrical system, process 600 may initiate load shedding for that load (only).

Upon identification of the low-voltage load(s) to be shed, process 600 may proceed to block 615, where a load shed request is executed by transmitting a request to the switched power distributor 126 and/or power distribution 228, which in turn may reduce or cut off power to the identified load(s).

At block 620, process 600 may display a message to an actor or user associated with the vehicle indicating the initiation of load shedding. For example, a message may be displayed via user interface 210. Accordingly, a user may be made aware of the load shedding and/or underlying condition of the vehicle. Process 600 may then terminate.

The various example systems and methods herein may advantageously provide for electrical isolation of a potentially dangerous or damaging thermal event in a traction battery, while also permitting mobility of the vehicle at least for a short range or short duration. Moreover, the example illustrations herein may also facilitate alerts in response to detected thermal conditions or events, thereby allowing intervention by emergency personnel or a vehicle operator.

The foregoing description includes exemplary embodiments in accordance with the present disclosure. These examples are provided for purposes of illustration only, and not for purposes of limitation. It will be understood that the present disclosure may be implemented in forms different from those explicitly described and depicted herein and that various modifications, optimizations, and variations may be implemented by a person of ordinary skill in the present art, consistent with the following claims.

What is claimed is:

1. An electrical load management system for a vehicle, comprising:
   a converter;
   an electrical bus configured to supply low-voltage power from one or both of the converter and a low-voltage battery; and
   a controller configured to:
      detect a load shed trigger of the converter;
      in response to the detection, select one or more low-priority loads from a plurality of electrical loads in connection with the electrical bus; and
      reduce electrical power consumption by the one or more low-priority loads based on a setting of the one or more low-priority loads.

2. The system of claim 1, further comprising:
   the low-voltage battery;
   a traction battery configured to supply a high-voltage input to the converter; and a traction motor in connection with the traction battery, the traction motor configured to supply motive power to one or more ground-engaging vehicle wheels.

3. The system of claim 2, wherein the load shed trigger includes at least one of a power limitation of the traction battery or a fault of the traction battery.

4. The system of claim 1, wherein the load shed trigger includes at least one of an undervoltage of the electrical bus below the reduced voltage or a fault of the converter.

5. The system of claim 1, wherein the controller is further configured to determine a coolant temperature reaching or exceeding a threshold temperature,
wherein the load shed trigger is detected based on the coolant temperature reaching or exceeding the threshold temperature; and
wherein the one or more low-priority loads is selected based at least upon the coolant temperature reaching or exceeding the threshold temperature.

6. The system of claim 1, wherein the load shed trigger includes one or more of a coolant temperature exceeding a predetermined threshold, a power limitation of the traction battery, a fault of the traction battery, an undervoltage of the electrical bus below the reduced voltage, or a fault of the converter.

7. The system of claim 1, wherein the controller is configured to detect a load shed trigger based upon a thermal derating condition of the converter.

8. The system of claim 1, further comprising a coolant loop configured to circulate a coolant through the converter.

9. The system of claim 1, wherein the converter is a DC/DC converter.

10. An electrical load management system for a vehicle, comprising:
a converter configured to step down electrical power from an input voltage to a reduced voltage;
an electrical bus in electrical communication with the converter, the electrical bus configured to supply electrical power received from the converter at the reduced voltage to a plurality of electrical loads; and
a controller configured to detect a load shed trigger, and in response to the detection select one or more low-priority loads included in the plurality of electrical loads, the controller configured to send to the one or more low-priority loads a bus message to reduce electrical power consumption.

11. The system of claim 10, wherein the controller is configured to detect a load shed trigger based upon a condition of the converter.

12. The system of claim 11, wherein the condition of the converter is a thermal derating condition of the converter.

13. The system of claim 10, wherein the load shed trigger includes one or more of a coolant temperature exceeding a predetermined threshold, a power limitation of a traction battery connected to the converter, a fault of the traction battery, an undervoltage of the electrical bus below the reduced voltage, or a fault of the converter.

14. The system of claim 10, wherein the load shed trigger comprises a coolant temperature exceeding a predetermined threshold.

15. A method of managing electrical loads in a power system for a vehicle, comprising:
reducing an input voltage of electrical power received at a converter to a reduced voltage;
using the converter, supplying the electrical power at the reduced voltage to an electrical bus, the electrical bus configured to supply electrical power received from the converter at the reduced voltage to a plurality of electrical loads;
detecting a load shed trigger; and
in response to the detection, reducing electrical power consumption by the one or more low-priority loads included in the plurality of electrical loads based on a setting of the one or more low-priority loads.

16. The method of claim 15, further comprising:
electrically connecting a low-voltage battery with the electrical bus, the low-voltage battery configured to supply electrical power at the reduced voltage via the electrical bus;
selectively supplying power to the converter at the input voltage with a traction battery; and
selectively powering, with the traction battery, a traction motor configured to supply motive power to one or more ground-engaging wheels of a vehicle;
wherein detecting the load shed trigger includes establishing one or more of a coolant temperature exceeding a predetermined threshold, a power limitation of the traction battery, a fault of the traction battery, an undervoltage of the electrical bus below the reduced voltage, or a fault of the converter.

17. The method of claim 15, wherein detecting the load shed trigger includes detecting a thermal derating condition of the converter.

18. The method of claim 15, wherein detecting the load shed trigger comprises determining that a coolant temperature exceeds a predetermined threshold.

* * * * *